(12) United States Patent
Bagchi et al.

(10) Patent No.: US 11,333,510 B2
(45) Date of Patent: May 17, 2022

(54) LEARNING LOCATIONS OF INTEREST USING IOT DEVICES

(71) Applicant: Aeris Communications, Inc., San Jose, CA (US)

(72) Inventors: Anupam Bagchi, San Jose, CA (US); Subramanian Balakrishnan, Cupertino, CA (US); Hector Aquiles Rodriguez, Chicago, IL (US)

(73) Assignee: AERIS COMMUNICATIONS, INC., San Jose, CA (US)

( * ) Notice: Subject to any disclaimer, the term of this patent is extended or adjusted under 35 U.S.C. 154(b) by 0 days.

(21) Appl. No.: 16/014,126

(22) Filed: Jun. 21, 2018

(65) Prior Publication Data

US 2018/0376447 A1 Dec. 27, 2018

Related U.S. Application Data

(60) Provisional application No. 62/523,748, filed on Jun. 22, 2017.

(51) Int. Cl.
*G01C 21/34* (2006.01)
*G06Q 10/04* (2012.01)
(Continued)

(52) U.S. Cl.
CPC ....... *G01C 21/343* (2013.01); *G01C 21/3484* (2013.01); *G01C 21/3492* (2013.01);
(Continued)

(58) Field of Classification Search
CPC ..... H04W 4/023; H04W 4/021; H04W 64/00; G06F 17/30864; G06F 16/951;
(Continued)

(56) References Cited

U.S. PATENT DOCUMENTS 6,239,707 B1 5/2001 Park
6,496,775 B2 12/2002 McDonald, Jr
(Continued)

FOREIGN PATENT DOCUMENTS

CN 104835029 8/2015
WO 2014106299 7/2014
(Continued)

OTHER PUBLICATIONS

International Search Report and Written Opinion from International Application No. PCT/US16/46923 dated Oct. 27, 2016.
(Continued)

*Primary Examiner* — Wayne H Cai
(74) *Attorney, Agent, or Firm* — Brundidge & Stanger, P.C.

(57) ABSTRACT

In one example embodiment, a computer-implemented method and system for learning places of interest are disclosed. The method includes learning and storing location information of at least one mobile device; detecting a location where no movement of the at least one mobile device has occurred over a pre-determined duration of time; determining whether the detected location is classified as a location of interest based on a predefined criteria; and clustering the learned location of interest into bigger groups based on location information of the learned location of interest using a pre-defined criteria.

24 Claims, 10 Drawing Sheets

(51) Int. Cl.
  *H04W 4/021* (2018.01)
  *G01C 21/36* (2006.01)
  *G06F 16/9537* (2019.01)
  *G06N 20/00* (2019.01)
  *G06F 16/951* (2019.01)
  *H04L 67/12* (2022.01)
  *H04W 4/02* (2018.01)
  *H04W 64/00* (2009.01)
  *G06N 5/04* (2006.01)

(52) U.S. Cl.
  CPC ....... *G01C 21/3676* (2013.01); *G06F 16/951* (2019.01); *G06F 16/9537* (2019.01); *G06N 20/00* (2019.01); *G06Q 10/047* (2013.01); *H04L 67/12* (2013.01); *H04W 4/021* (2013.01); *H04W 4/023* (2013.01); *H04W 64/00* (2013.01); *G06N 5/04* (2013.01)

(58) Field of Classification Search
  CPC .. G06F 16/9537; G06N 99/005; G06N 20/00; G06N 5/04; G01C 21/343; G01C 21/3676; G01C 21/3492; G01C 21/3484; G06Q 10/047; H04L 67/12
  See application file for complete search history.

(56) References Cited

U.S. PATENT DOCUMENTS

| | | |
|---|---|---|
| 6,651,001 B2 | 11/2003 | Apsell |
| 6,687,356 B1 | 2/2004 | Glitho |
| 6,931,309 B2 | 8/2005 | Phelan |
| 7,213,048 B1 | 5/2007 | Parupudi |
| 7,246,009 B2 | 7/2007 | Hamblen |
| 7,801,538 B2 | 9/2010 | Weiser |
| 7,848,765 B2 | 12/2010 | Phillips |
| 8,000,726 B2 | 8/2011 | Altman |
| 8,018,329 B2 | 9/2011 | Morgan |
| 8,135,505 B2 | 3/2012 | Vengroff |
| 8,346,230 B2 | 1/2013 | Goodman |
| 8,473,148 B2 | 6/2013 | Nielsen |
| 8,510,200 B2 | 8/2013 | Pearlman |
| 8,566,014 B1 | 10/2013 | Kozolchyk |
| 8,589,330 B2 | 11/2013 | Petersen |
| 8,593,277 B2 | 11/2013 | Nath |
| 8,595,696 B2 | 11/2013 | Maximilien et al. |
| 8,630,768 B2 | 1/2014 | McClellan |
| 8,667,456 B1 | 3/2014 | Czymontek |
| 8,725,569 B2 | 5/2014 | Liang |
| 8,755,824 B1 | 6/2014 | Wang |
| 8,756,010 B2 | 6/2014 | Gupta |
| 8,869,038 B2 | 10/2014 | Eick |
| 8,909,256 B2 | 12/2014 | Fraccaroli |
| 8,913,983 B2 | 12/2014 | Lorello |
| 8,949,022 B1 | 2/2015 | Fahrner |
| 8,971,930 B2 | 3/2015 | Li |
| 9,014,888 B2 | 4/2015 | Sukkarié et al. |
| 9,043,222 B1 | 5/2015 | Kerr |
| 9,076,009 B2 | 7/2015 | Sathish |
| 9,076,165 B2 | 7/2015 | Busch |
| 9,104,738 B2 | 8/2015 | Kay et al. |
| 9,119,038 B2 | 8/2015 | Woods |
| 9,122,693 B2 | 9/2015 | Blom |
| 9,140,567 B2 | 9/2015 | Fryer |
| 9,141,266 B2 | 9/2015 | McCormick |
| 9,146,721 B1 | 9/2015 | Nagaraja |
| 9,210,534 B1 | 12/2015 | Matthieu |
| 9,225,519 B1 | 12/2015 | Fraccaroli |
| 9,250,887 B2 | 2/2016 | Lucovsky |
| 9,275,114 B2 | 3/2016 | Milton |
| 9,277,362 B2 | 3/2016 | Li |
| 9,349,128 B1 | 5/2016 | Kerr |
| 9,424,751 B2 | 8/2016 | Hodges |
| 9,507,346 B1 | 11/2016 | Levinson |
| 9,576,295 B2 | 2/2017 | Volpe |
| 9,615,202 B2 | 4/2017 | Dal Santo |
| 9,661,470 B1 | 5/2017 | Du Bois |
| 9,712,486 B2 | 7/2017 | Johnson |
| 9,712,972 B2 | 7/2017 | Lynch |
| 9,741,191 B1 | 8/2017 | Wong |
| 9,774,994 B2 | 9/2017 | Chen |
| 9,792,567 B2 | 10/2017 | Khasis |
| 9,805,521 B1 | 10/2017 | Davidson |
| 9,817,948 B2 | 11/2017 | Swank |
| 9,826,345 B2 | 11/2017 | Haro |
| 9,838,843 B1 | 12/2017 | Bajaj |
| 9,871,865 B2 | 1/2018 | Shaashua |
| 9,878,663 B1 | 1/2018 | Kochura |
| 9,988,058 B2 | 6/2018 | Phillips |
| 10,015,353 B1 | 7/2018 | Perez |
| 10,037,668 B1 | 7/2018 | DesGarennes |
| 10,070,261 B2 * | 9/2018 | Dal Santo ................. G01S 5/00 |
| 10,097,960 B2 | 10/2018 | Tung |
| 10,231,084 B2 | 3/2019 | Bagchi |
| 10,735,904 B2 | 8/2020 | Dhillon |
| 2004/0111195 A1 | 6/2004 | Vries |
| 2004/0193617 A1 | 9/2004 | Adler |
| 2005/0090978 A1 | 4/2005 | Bathory |
| 2005/0096009 A1 | 5/2005 | Ackley |
| 2005/0156715 A1 | 7/2005 | Zou |
| 2006/0248121 A1 | 11/2006 | Cacenco et al. |
| 2007/0143013 A1 | 6/2007 | Breen |
| 2007/0173991 A1 | 7/2007 | Tenzer |
| 2007/0173994 A1 | 7/2007 | Kubo |
| 2008/0033791 A1 | 2/2008 | Jones |
| 2008/0125965 A1 | 5/2008 | Carani |
| 2008/0319602 A1 | 12/2008 | McClellan |
| 2009/0009321 A1 | 1/2009 | McClellan |
| 2009/0079555 A1 | 3/2009 | Aguirre De Carcerlonio |
| 2009/0248883 A1 | 10/2009 | Suryanarayana |
| 2009/0019357 A1 | 11/2009 | Cudich |
| 2009/0275348 A1 | 11/2009 | Weinreich |
| 2009/0309789 A1 | 12/2009 | Verechtchiagine |
| 2009/0326991 A1 | 12/2009 | Wei |
| 2010/0027730 A1 | 2/2010 | Argoud |
| 2010/0075648 A1 | 3/2010 | Matsuoka et al. |
| 2010/0094500 A1 | 4/2010 | Jin |
| 2010/0106603 A1 | 4/2010 | Dey |
| 2010/0203901 A1 | 8/2010 | Dinoff |
| 2010/0214068 A1 | 8/2010 | Nadkarni |
| 2010/0280734 A1 | 11/2010 | Brinton |
| 2010/0289644 A1 | 11/2010 | Slavin |
| 2010/0306735 A1 | 12/2010 | Hoff et al. |
| 2011/0112768 A1 | 5/2011 | Doyle |
| 2011/0126168 A1 | 5/2011 | Ilyayev |
| 2011/0178811 A1 | 7/2011 | Sheridan |
| 2011/0202591 A1 | 8/2011 | Reis |
| 2011/0208797 A1 | 8/2011 | Kim |
| 2011/0238457 A1 | 9/2011 | Mason |
| 2012/0058764 A1 | 3/2012 | Kang |
| 2012/0260228 A1 | 10/2012 | Mallick |
| 2012/0330722 A1 | 12/2012 | Volpe et al. |
| 2013/0031029 A1 | 1/2013 | Davidson |
| 2013/0055253 A1 | 2/2013 | Jubran |
| 2013/0066688 A1 | 3/2013 | Pinkus |
| 2013/0090106 A1 | 4/2013 | Mathews |
| 2013/0093603 A1 | 4/2013 | Tschirhart |
| 2013/0103307 A1 | 4/2013 | Sartipi |
| 2013/0190967 A1 | 7/2013 | Hassib |
| 2013/0212130 A1 | 8/2013 | Rahnama |
| 2013/0245880 A1 | 9/2013 | McQuade |
| 2013/0254755 A1 | 9/2013 | Yousouf |
| 2013/0267253 A1 | 10/2013 | Case |
| 2013/0289819 A1 | 10/2013 | Hassib |
| 2013/0289873 A1 | 10/2013 | Mitchell |
| 2013/0297803 A1 | 11/2013 | Hate |
| 2013/0304347 A1 | 11/2013 | Davidson |
| 2013/0340305 A1 | 12/2013 | Mobley |
| 2013/0346336 A1 | 12/2013 | Murphy |
| 2014/0026113 A1 | 1/2014 | Hoff et al. |
| 2014/0031073 A1 * | 1/2014 | Davis ..................... H04W 4/08 |
| | | 455/518 |
| 2014/0057648 A1 | 2/2014 | Lyman |
| 2014/0059695 A1 | 2/2014 | Parecki |

(56) References Cited

U.S. PATENT DOCUMENTS

| | | |
|---|---|---|
| 2014/0062695 A1 | 3/2014 | Rosen |
| 2014/0095214 A1 | 4/2014 | Mathe et al. |
| 2014/0141767 A1 | 5/2014 | Sharma |
| 2014/0155094 A1 | 6/2014 | Zises |
| 2014/0172294 A1 | 6/2014 | Karla |
| 2014/0215043 A1 | 7/2014 | Ryu et al. |
| 2014/0226470 A1 | 8/2014 | Kim |
| 2014/0274115 A1 | 9/2014 | Michalson |
| 2014/0274136 A1 | 9/2014 | Edge |
| 2014/0282380 A1 | 9/2014 | Abrahams |
| 2014/0325048 A1 | 10/2014 | Benchorin |
| 2014/0325394 A1 | 10/2014 | Hamill |
| 2014/0351411 A1 | 11/2014 | Woods |
| 2014/0357295 A1 | 12/2014 | Skomra |
| 2014/0359552 A1 | 12/2014 | Misra |
| 2014/0370911 A1 | 12/2014 | Gorgenyi |
| 2014/0380264 A1 | 12/2014 | Misra et al. |
| 2015/0012908 A1 | 1/2015 | Farooqi |
| 2015/0095355 A1 | 4/2015 | Patton |
| 2015/0106206 A1* | 4/2015 | Vengroff ............... G06Q 30/02 705/14.58 |
| 2015/0135163 A1 | 5/2015 | Mun |
| 2015/0149980 A1 | 5/2015 | Zhong |
| 2015/0163626 A1 | 6/2015 | Zimmer |
| 2015/0163630 A1 | 6/2015 | Hughes |
| 2015/0173037 A1 | 6/2015 | Pijl |
| 2015/0180746 A1 | 6/2015 | Day, II |
| 2015/0181016 A1 | 6/2015 | Jain |
| 2015/0245189 A1 | 8/2015 | Nalluri |
| 2015/0264527 A1* | 9/2015 | Wang ............... H04W 4/021 455/456.3 |
| 2015/0271033 A1 | 9/2015 | Srivastava et al. |
| 2015/0278759 A1 | 10/2015 | Harris |
| 2015/0304175 A1 | 10/2015 | Maes |
| 2015/0350843 A1 | 12/2015 | Jensen et al. |
| 2016/0003627 A1 | 1/2016 | Bonhomme |
| 2016/0041833 A1 | 2/2016 | Standley et al. |
| 2016/0042303 A1 | 2/2016 | Medina |
| 2016/0050536 A1* | 2/2016 | You ............... G06F 17/30241 455/456.3 |
| 2016/0057209 A1 | 2/2016 | Parikh |
| 2016/0066141 A1 | 3/2016 | Jain |
| 2016/0071333 A1 | 3/2016 | Haidar |
| 2016/0073229 A1* | 3/2016 | Haro ............... H04W 4/029 455/456.3 |
| 2016/0083697 A1 | 3/2016 | Phillips |
| 2016/0103657 A1 | 4/2016 | Zhang et al. |
| 2016/0104096 A1 | 4/2016 | Ovick |
| 2016/0116596 A1 | 4/2016 | Rajala |
| 2016/0124742 A1 | 5/2016 | Rangasamy |
| 2016/0150021 A1 | 5/2016 | Britt |
| 2016/0173404 A1 | 6/2016 | Pouyllau |
| 2016/0203651 A1 | 7/2016 | Heath |
| 2016/0247330 A1 | 8/2016 | Rork |
| 2016/0284184 A1 | 9/2016 | Bean et al. |
| 2016/0286355 A1 | 9/2016 | Shur |
| 2016/0357522 A1 | 12/2016 | Wee |
| 2016/0371553 A1 | 12/2016 | Farnham, IV |
| 2017/0006135 A1 | 1/2017 | Siebel |
| 2017/0006419 A1 | 1/2017 | Rajala |
| 2017/0006430 A1 | 1/2017 | Chao |
| 2017/0111765 A1* | 4/2017 | Benegal ............... G01S 19/34 |
| 2017/0171204 A1* | 6/2017 | Forood ............... H04W 4/70 |
| 2017/0203633 A1 | 7/2017 | High |
| 2017/0244841 A1 | 8/2017 | Costandi |
| 2017/0270792 A1 | 9/2017 | Breton |
| 2017/0323259 A1 | 11/2017 | Gillen |
| 2017/0349058 A1 | 12/2017 | Bernier |
| 2017/0359237 A1 | 12/2017 | Hao |
| 2017/0366933 A1 | 12/2017 | Chen |
| 2018/0005522 A1 | 1/2018 | Pogula |
| 2018/0049001 A1 | 2/2018 | Volozh |
| 2018/0063666 A1 | 3/2018 | Broodney |
| 2018/0120826 A1 | 5/2018 | Rhim |
| 2018/0199239 A1 | 7/2018 | Sabater Maroto |
| 2018/0255428 A1 | 9/2018 | Bagchi |
| 2018/0302476 A1 | 10/2018 | Perez |
| 2018/0365785 A1 | 12/2018 | Boss |
| 2018/0372503 A1 | 12/2018 | Bagchi |
| 2019/0266518 A1 | 8/2019 | Medina |
| 2019/0285426 A1 | 9/2019 | Mitchell |

FOREIGN PATENT DOCUMENTS

| | | |
|---|---|---|
| WO | 2015143416 | 9/2015 |
| WO | 2016025495 | 2/2016 |

OTHER PUBLICATIONS

Brouwers et al., Dwelling in the canyons: Dwelling detection in Urban Environments Using GPS, Wi-Fi, and Geolocation, Dec. 14, 2011.

Boukhechba et al., Hybrid battery-friendly mobile solution for extracting users' visited places, Dec. 31, 2016.

Perera et al., Energy Efficient Location and Activity-aware On-Demand Mobile Distributed Sensing Platform for Sensing as a Service in IoT Clouds, http://arxiv.org/abs/1601.00428, Apr. 1, 2016.

Merlino et al., Mobile crowdsensing as a service: A platform for applications on top of sensing Clouds, http://www.sciencedirect.com/science/article/pii/S0167739X15002976, Mar. 2016.

International Search Report and Written Opinion from International Application No. PCT/US16/46924 dated Oct. 28, 2016.

Wikipedia, "Virtual Machine," 2014, pp. 1-9, downloaded from the Wayback Machine Internet Archive at ,<url>:https://web.archive.org/web/20140402003043/https://en.wikipedia.org/wiki/Virtual_machine.

Wikipedia, "Virtual Machine," 2013, pp. 1-11, downloaded from the Wayback Machine Internet Archive at <url>:https://web.archive.org/web/20130402165412/https://en.wikipedia.org/wiki/Wireless_sensor_network.

GeoFencing & Alerts, myGeoTracking, Abaqus Inc., Jul. 11, 2016, 1 page, Retrieved from: http://www.mygeotracking.com/solutions/pdf/geo_fencing_alerts.pdf.

Almomani et al., "Ubiquitous GPS vehicle tracking and management system", In Applied Electrical Engineering and Computing Technologies (AEECT), Dec. 31, 2011, IEEE Jordan Conference on, pp. 1-6.

Dennis Mbuvi, "Airtel Provide Connectivity to 2nk Sacco's Frotcom Fleet Management System", Airtel, Africa News Service, Feb. 2013.

Geria et al., "Internet of vehicles: From intelligent grid to autonomous cars and vehicular clouds", In Internet of Things (WF-IoT), 2014 IEEE World Forum on, pp. 241-246., Dec. 31, 2014.

Rusu et al., "Localization in large-scale underground environments with RFID", 24th Canadian Conference on Electrical and Computer Engineering (CCECE), May 31, 2011.

Jin et al., "An information framework for creating a smart city through internet of things", IEEE Internet of Things Journal, 1(2), pp. 112-121, Dec. 31, 2014.

Gantait et al., Use vehicle sensor data to execute smart transactions in Blockchain, IBM, Jun. 5, 2017., Retrieved from Internet: https://www.ibm.com/developerworks/cloud/library/cl-blockchain-for-cognitive-iot-apps2/.

Adelabu, Design and Construction of a Vehicle Tracking and Accident Alert System Using GPS and GSM Module, Nov. 30, 2017., Retrieved from the Internet: http://repository.fuoye.edu.ng/bitstream/123456789/1441/1/DESIGN%20AND%20CONSTRUCTION%20%20OF%20A%20VEHICLE%20TRACKING%20AND%20ACCIDENT%20ALERT%20SYSTEM%20%20USING%20%20GPS%20%20AND%20GSM%20MODULE.pdf. (C) Nov. 2017.

AT&T, Fleet management and tracking, Feb. 26, 2018., Retrieved from the Internet: https://www.business.att.com/solutions/Service/internet-of-things/vehicle-solutions/iot-connected-fleet/. (C)2018. Earliest publication date via Wayback archive:http://web.archive.org/web/20180226093503/https://www.business.att.com/solutions/Service/internet-of-things/vehicle-solutions/iot-connected-fleet/.

Frey, IoT ushers in a new era for supply chain fulfillment, Oct. 25,

(56) References Cited

OTHER PUBLICATIONS

2017, Retrieved from the Internet: https://internetofthingsagenda.techtarget.com/blog/IoT-Agenda/IoT-ushers-in-a-new-era-for-supply-chain-fulfillment.

International Search Report and Written Opinion from International Application No. PCTUS1838825 dated Sep. 18, 2018.

Wei-Tek Tsai et al., "Service-Oriented Cloud Computing Architecture," 2010 [retrieved on May 9, 2019], Seventh International Conference on Information Technology: New Generations, pp. 684-689, downloaded from: https://ieeexplore.ieee.org/. 2010.

B Loganayagi et al., "Creating Virtual Platform for Cloud Computing," 2010 [retrieved on May 9, 2019], 2010 IEEE International Conference on Computational Intelligence and Computing Research, pp. 1-4, downloaded from: https://ieeexplore.ieee.org 2010.

Radha Guha et al., "Impact of Web 2.0 and Cloud Computing Platform on Software Engineering," 2011 [retrieved on May 9, 2019], International Symposium on Electronic System Design, pp. 213-218, downloaded from:https//ieeexplore.ieee.org 2011.

\* cited by examiner

500  FIG. 5A

500'  FIG. 5B

Cluster of Vehicles: Exemplary Mobile Application User Interface Showing A Group Of Vehicles That Are In Close Proximity Represented In A Cluster-circle. Counts Of Vehicles May Also Be Displayed In The Circle.

US 11,333,510 B2

LEARNING LOCATIONS OF INTEREST USING IOT DEVICES

CROSS-REFERENCE TO RELATED APPLICATIONS

Under 35 USC 119(e), this application claims priority to U.S. provisional application Ser. No. 62/523,748, entitled "LEARNING LOCATIONS OF INTEREST USING IoT DEVICES", filed on Jun. 22, 2017.

FIELD OF THE INVENTION

The embodiments described herein relate generally to cellular networks and more particularly to automated learning of locations of interest using IoT devices.

BACKGROUND

In many Internet-of-Things (IoT)/Machine-to-Machine (M2M) solutions, particularly running on moving machines, for example, vehicles, it may be useful to the fleet operator to learn addresses of discovered places or locations of interest and for city officials to provide services around popular spots depending on the popularity of such places or locations of interest.

SUMMARY

In one example embodiment, a computer implemented method for learning places of interest is disclosed. The method includes learning and storing location information of at least one mobile device; detecting a location where no movement of the at least one mobile device has occurred over a pre-determined duration of time; determining whether the detected location is classified as a location of interest based on a predefined criteria; and clustering the learned location of interest into bigger groups based on location information of the learned location of interest using a pre-defined criteria.

In another example embodiment, a system for learning places of interest is disclosed. The system for learning places of interest comprises at least one mobile device, a data processing system and a user interface, wherein the data processing system further includes a location-aware database, wherein the database learns and stores location information of the at least one mobile device; a processor, wherein the processor detects a location where no movement of the at least one mobile device has occurred over a pre-determined duration of time, and determines whether the detected location is classified as a location of interest based on a predefined criteria; and a clustering engine, wherein the clustering engine forms bigger groups of learned places based on location information using a pre-defined criteria.

In an embodiment, a non-transitory computer-readable medium is disclosed. The computer readable medium includes executable instructions stored therein that, when executed, cause one or more processors corresponding to a system having a database, a data processing system including a database, a processor and a user interface to perform operations including learning and storing location information of at least one mobile device to a database; detecting a location where no movement of the at least one mobile device has occurred over a pre-determined duration of time; determining whether the detected location is classified as a location of interest based on a predefined criteria; and clustering the learned location of interest into bigger groups based on location information of the learned location of interest using a pre-defined criteria.

BRIEF DESCRIPTION OF THE DRAWINGS

FIG. 5A illustrates an exemplary user interface for viewing learned places of interest using IoT devices according to an embodiment described herein.

FIG. 5B illustrates an exemplary user interface for viewing learned places of interest using IoT devices according to an embodiment described herein.

DETAILED DESCRIPTION

Figure 1:
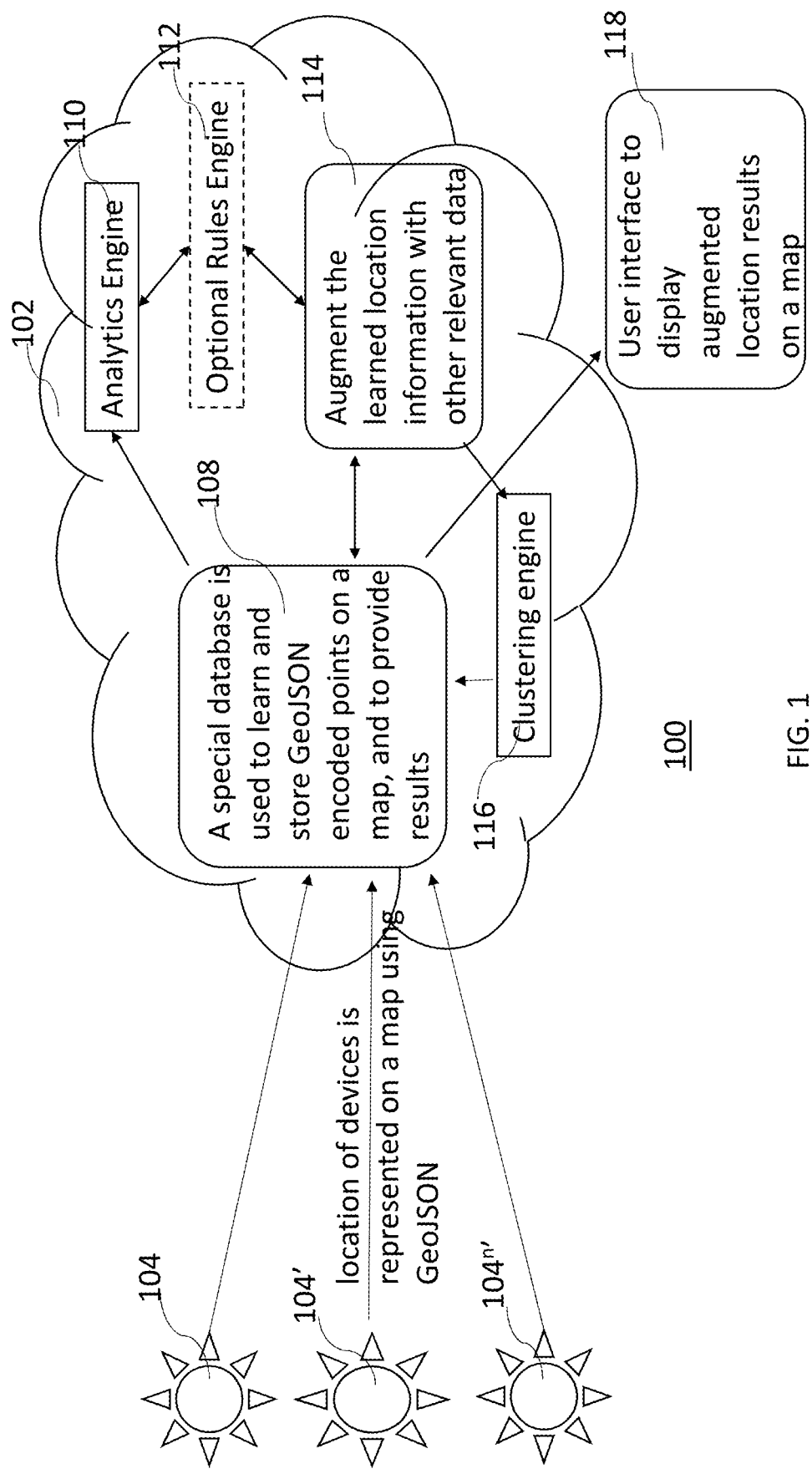
FIG. 1 is an overview diagram for the method and system for learning places of interest using IoT devices according to an embodiment described herein.

The embodiments described herein relate generally to wireless networks and more particularly to the automatic learning of locations of interest using IoT devices that are capable of moving, connected to the cellular network and sharing other characteristics (e.g., devices belonging to a commercial fleet of vehicles). The IoT devices have the ability to transmit data over the internet. The transmission may also take place, for instance, through a blue-tooth connection to one's phone which uses cellular connectivity. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the embodiments described herein are not intended to be limited to the embodiments shown, but is to be accorded the widest scope consistent with the principles and features described herein.

In many Internet-of-Things (IoT)/Machine-to-Machine (M2M) solutions, particularly those running on moving machines, also known as IoT devices, for example, commercial fleets of vehicles, it may be useful to the fleet operator to discover addresses of locations that multiple users visit (such as restaurants, places of worship, etc.), to determine what is located at that address, and to make those discovered locations available for other users by entering addresses of discovered places and enabling users to select that type of location, such as by using pop-up list of addresses. In a solution provided to a city or other government agency, it may be useful for officials to discover locations that many persons visit and to provide services around popular spots along the highway depending on the number of visits.

This invention pertains to automatic learning of resting places of vehicles, also known as IoT devices, or places of interest to vehicle drivers, for example, drivers operating vehicles in a commercial fleet. As drivers drive the vehicles through highways, city roads and in the countryside, they stop at various locations for business reasons as well as personal reasons. The present invention helps identify locations where the vehicles have stopped for more than a defined duration and more than a predetermined frequency by progressively learning such places over time. As more and more vehicles appear at the same location, the number of times the place has been visited along with the identity of vehicles including the duration of stop by each vehicle is stored in a storage/learning database.

The application of this algorithm is not limited to commercial fleets. It could also be applied to cars or other IoT devices enabled for wireless connectivity to transmit data, that stop at specific locations may enable the user (an individual, e.g., a fleet operator or a fleet management entity as may be applicable in this case) to sort out the most likely place of visit for future trips. The locations may be identified by various parameters including but not limited to latitude, longitude etc. Other co-ordinate systems may also be used to determine location. The locations of interest are determined based on number of visits, day, date and/or time of the visits, duration of the visits etc.

The learned places information may then be augmented with more information like street address of the learned location, name of the learned location, type of business or other activity at the learned location or other information that might suggest that the learned place/location should be ignored as a valid stop-location or location of interest. This augmented information may then be presented to the fleet operator or the fleet management entity for action. The fleet operator could, for example, choose to offer drivers locations of businesses or other entities by type using a pop-list of addresses. A fleet operator may be a person who is responsible for managing fleets. Each account may have one or more fleets connected to it. The data augmentation allows the system and method to associate an 'intent' of drivers when the drivers are seen approaching a known place. The fleet operator may also be allowed to mark some places as 'hidden' which may then be filtered out when displaying it back to the operator of the IoT devices or to other users of the solution, such as drivers.

For solutions provided to a city or other governmental agency, this learned location information, along with other information such as number of visitors, or frequency, time or duration of visits, may be useful for city officials to provide services or manage traffic around the popular spots depending on the available information.

There are several unique features of this invention. A salient feature of this invention is the unique clustering approach used when collecting or clustering the points or location of interest with lower radius of separation into those with a larger radius of separation. One of the pitfalls when doing such an aggregation is coming up with a point or location that is not a typical place on the map (like a water body near an arched piece of land). The algorithm used herein avoids the issue by taking the modal values of places by popularity of visits (e.g., highest number of visits) to determine the center of the larger clusters. The result is a more natural looking cluster centered around a true resting place that may represent the surrounding resting places with lower popularity ranking.

Standard density-based clustering algorithms like DBSCAN, and OPTICS may require human inputs (such as number of clusters, or number of items per cluster) that are hard to provide. This algorithm works without any human input and comes up with natural clusters.

Standard clustering algorithms may leave out many smaller resting places calling such points or locations 'outliers'. The system and method as described herein provides inclusion of each and every resting place/location of interest in the learning/storage database with an ability to filter out the less popular ones through a web-service accessed from the user interface. Being able to include ALL resting locations/locations of interest in the clusters is a unique feature of this algorithm. Details such as information of vehicles visiting the place, number of visits, time of visit, day of the visit and duration of each visit are preserved when creating the clusters.

The ability to match a discovered place or locations of interest with a user-defined place or a pre-existing place or pre-existing locations of interest, and the ability to filter out the user-defined places or locations of interest, or pre-existing places or locations of interest, when suggesting new places or locations of interest to the operator is a useful feature, which is also unique.

The ability to hide a discovered place from the user interface and continue to gather data about the same place in the background so that in future the operator can still UNHIDE it, is unique and provides control to the user of the system where the user can control what they would like to see by using, for example, hide/unhide options. The hide/unhide option may be used by a fleet operator, for example, to gather data in the background where the fleet operator may have control on whether the operator of the device, for example, driver of the vehicle, is able to see that data.

Learning new places of interest progressively is a continuous process. While waiting until there are a significant number of data points indicating that a visited location is popular can give a higher degree of confidence that the location is significant, it is also true that learning a location earlier could be useful. The learning algorithm in the present invention allows learning to begin to be done in real-time or near real-time using a simple streaming API.

Serving the results in a Software-as-a-Service model requires storing the data under one umbrella but with enough separation between co-existing accounts so that information about behavior of devices belonging to one account is not presented to the owner of a different account. The algorithm in the present invention may process data gathered from devices belonging to multiple accounts together and store it together, which can assist with determining that a visited location is significant, but present the data on a per-account basis. Thus, data gathered from devices belonging to one account is not visible to any other account, however the data from different accounts may be used during the process to give meaningful results.

On the presentation layer, administrators (such as fleet operators) may be allowed to filter out results based on either (i) minimum number of visits to a place or by (ii) top N most popular places based on number of total visits to a place.

The front-end also provides administrator the ability to list all discovered places that are within a defined radius around a point of interest.

Some discovered places may be marked as IGNORED by the administrator, in which case when the higher-level aggregation happens, these ignored locations will not be displayed as a center of interest or locations of interest.

The system may also be set by an administrator to filter out discovered places based on apparent importance. This could be based on such factors as number of times vehicles that have visited that place, or the cluster radius around the point of interest (where higher radius indicates a lower degree of confidence that the point is a genuine point of interest).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is an overview diagram for the method and system for learning places of interest using IoT devices according to an embodiment described herein. As described herein, the system 100 includes devices 104, 104', . . . 104'''', a data processing system 102, including a storage database 108, an analytics engine 110, an optional rules engine 112, data augmentation engine 114, clustering engine 116, and a user interface 118. The data processing system may include different functional components described above as part of one data processor or may be present as more than one data processors.

The mobile devices 104, 104', . . . 104''' may include communication devices, for example, vehicles connected to the cellular network or cellular-enabled devices via SIMs that are installed in the communication devices either integrated in the vehicle itself or removably installed in the vehicle on each of the fleet vehicle. These communication devices may transmit relevant vehicle data to storage database 108 and/or the data processing system 102 of the monitoring system using a wireless communication technology, for example, a radio module or WiFi etc. In an embodiment, the device data may also be received from network elements.

The system configuration 100 may include an instance of a client application with a user interface 118 hosted thereon, for example, a desktop fleet application provided through a web-based portal used by the fleet manager to manage fleet vehicles, and/or fleet application operating on mobile devices, such as smartphones, used by the fleet manager to manage fleet vehicles or by vehicle drivers to access the information on the go, anywhere, any time.

The storage database 108 may be a special database, also known as a location aware database, which is used to learn and store GeoJSON encoded points on a map, and to provide results, for example, an instance offered by a provider of cloud computing services. The data is gathered into the storage database 108. For example, the system involves usage of a computer to determine proximity to a known place among a vast number of such locations on a map. A special kind of encoding called GeoJSON may be used to represent such points on a map. A special database, also known as a location-aware database, may be used to handle GeoJSON encoded points on a map, indexed appropriately based on geolocation to provide results in an efficient manner when requesting to display it on a map. The gathered data may include location information along with the device records, for example, device identifier, location of the device, location of the stop, duration of the stop, time of the day for the stop, day of the week for the stop, etc.

The algorithm may first scan through the device records and arrange them sequentially with respect to time, also called as a discovery process. It may then detect times and places where no movement of the device has occurred over a pre-determined time duration by the analytics engine 110. These may be labelled as resting places for the device, for example, the vehicle. The algorithm may then make a decision about inclusion of a place within the storage database as a location of interest. For example, if the learned place/location should be ignored using rules engine 112 as a valid stop-location or location of interest based on pre-defined criteria using analytics engine 110, then the location will be appropriately marked in the storage database as a KNOWN location (e.g., as opposed to a LEARNED location). The pre-defined criteria for inclusion may include any of: time of day or number of visits, or a combination thereof.

This data may be augmented with other relevant data by the data augmentation engine 114; for example, the learned location information may be augmented with more information like association of the learned location with the known address of a business or activity of a certain type (e.g., restaurant or place of worship). This information may be either entered by the fleet operator or derived from map services provided by third-parties. The most important pieces of information may be any of: (a) the address of the learned location (if known), (b) the name of the learned location (if defined by operator) and (c) the type of business at that location (if something is identifiable) or a combination thereof.

This data augmentation allows the system and method to associate an 'intent' when drivers are seen approaching a known place. The fleet operator may also be allowed to mark some places as 'hidden' which may then be filtered out when displaying it back to the fleet operator or the user of the device or mobile application. This augmented information may then be presented to the fleet operator to enter addresses of discovered places using pop list of addresses. A fleet operator may be a person who is responsible for managing fleets. Each account may have one or more fleets connected to it.

The rules engine 112 of the data processing system 102 may determine proximity of the discovered places to the known places by using a radius of proximity that may be defined by the user or provided to the system. If a newly discovered resting place is within the radius of proximity of an already defined place, it is assumed that the discovered place and the known place are the same, and that place is marked with the device information, time, and duration of stay of the current device. Otherwise, the location is treated as a newly discovered place and is added to the storage database 108.

The algorithm may be designed to work within the SaaS (Software as a Service) model where one physical database may be maintained for all accounts and that data used on an aggregate basis to assist the rules engine 112 in determining significance of visited places, but actual data of devices identified to each account is kept separate for each account and processed and displayed exclusively for that account within the database.

The actual process of discovery may be triggered by using a script that runs at periodic intervals, for example, once a day, once a week etc. An alternate way to trigger the discovery process may be through a streaming API that analyzes a trip as soon as it ends and stores the stop-locations during the trip. Alternatively, the discovery process may be defined as an ongoing process, collecting device data in near-real time.

The discovered places may then be clustered by the clustering engine 116 of the data processing system 102 to form bigger groups based on location. For example, locations of interest detected by the system, within a proximity radius of 1 mile from a known place of interest, may be grouped together as a cluster. The radius of proximity may thus define the granularity of the discovered place on a map. Several such collections or clusters with different radii of separation—all of which may be derived from the base collection with lowest granularity, may be stored in database 108 and presented to the user via user interface 118.

One of the typical problems associated in using aggregates of several places is the inherent risk of placing the aggregated value on a location which may or may not be an actual location on the map, for example, the aggregate location may turn out to be a water body in the area. The algorithm of the present invention is designed to avoid such a situation by taking the modal value when aggregating over nearby locations. Different criteria may be used when creating the locations with larger radius of separation, for example, the criteria used for aggregating may specify that "all locations must be 'at least' Y meters away from each other" where various values of Y may be used for creating locations or location clusters with different granularity.

Figure 2:
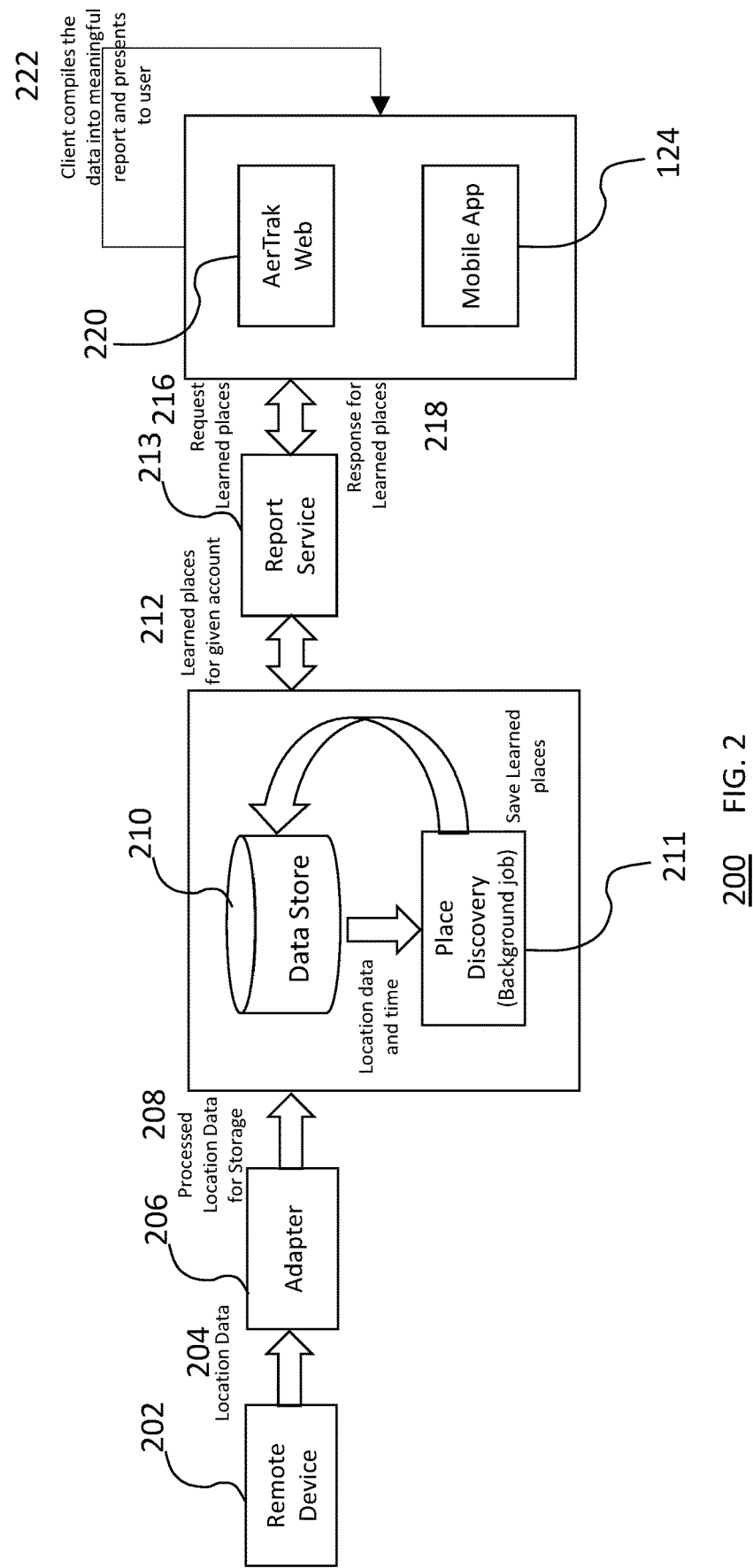
FIG. 2 illustrates a process and system for learning places of interest using IoT devices according to an embodiment described herein.

FIG. 2 illustrates a process and system 200 for learning places of interest using IoT devices according to an embodiment described herein. In an embodiment, Remote device 202 sends location data 204 to a server, also known as adapter 206. The adapter 206 processes the received location data 204 to remove anomalies and standardizes it across accounts and send it to a data storage also known as data store 210. A background job 211 is performed by a processor at pre-determined intervals, for example, every hour, every day, every week, at the end of a trip etc., that discovers places where vehicles/devices have stopped during each trip. This data is also saved into the datastore 210.

A request to view one or more learned places may be sent by the user or the fleet operator via user interface provided by web application 220 or mobile application 224 to the server 206. The request may be sent using reporting service 213 via step 216. The reporting service 213 retrieves this information via step 212 from the database 210 where it is stored and presents it as a response 218 to the client application 222 which then compiles the data into meaningful report and presents it to the user via user interface provided by fleet management web application 220 and/or fleet management mobile application 224.

Figure 3:
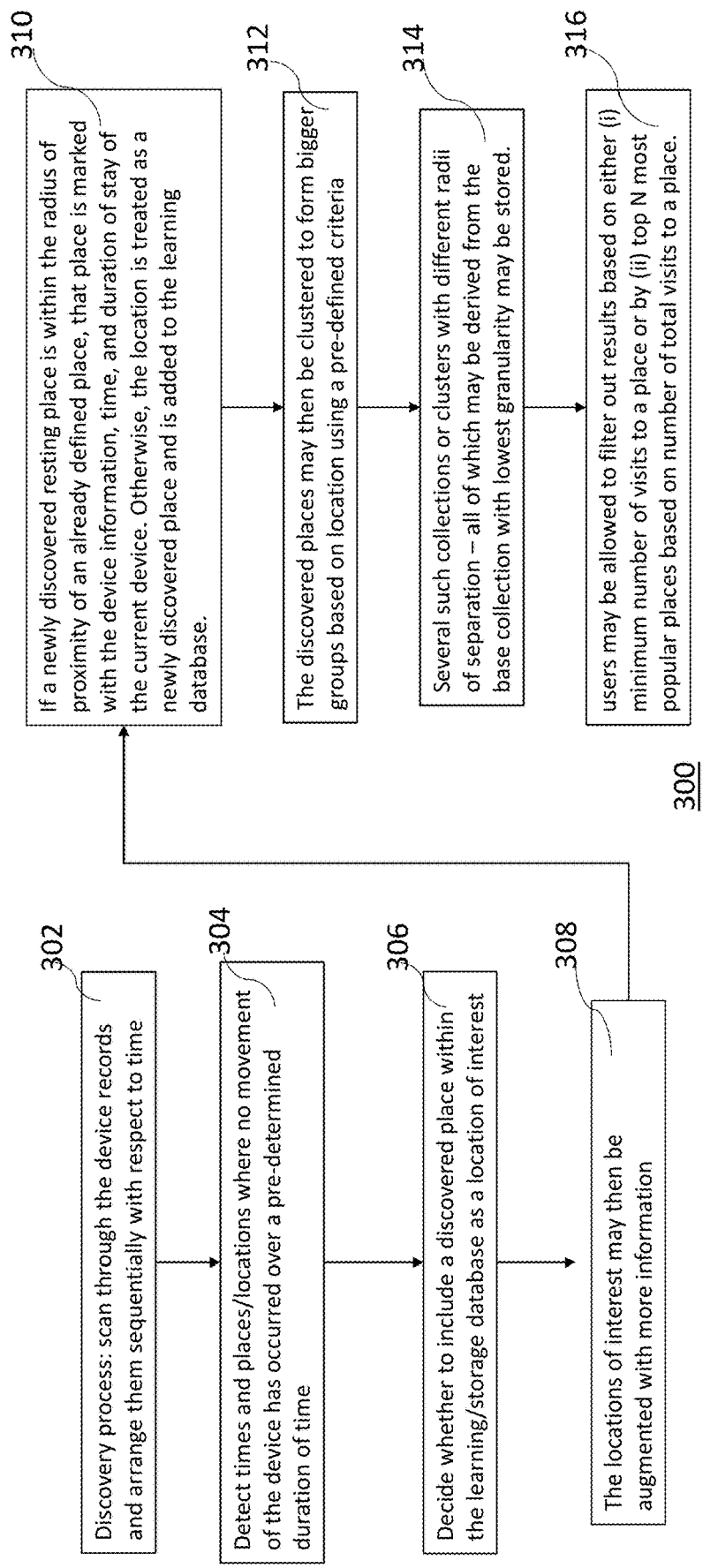
FIG. 3 illustrates a process for learning places of interest using IoT devices according to an embodiment described herein.

FIG. 3 illustrates a process for learning places of interest using IoT devices according to an embodiment described herein. In an embodiment, the method utilizes an algorithm that works incrementally on collected device records, for example, device identifier, location of the device, location of the stop, duration of stop, time of the day for the stop, day of the week for the stop, etc. The algorithm may first scan through the device records and arrange them sequentially with respect to time, also called as a discovery process via step 302. It may then detect times, e.g., date, day of the week, time of the day etc., and places, e.g., address, latitude-longitude etc., where no movement of the device has occurred over a pre-determined time duration via step 304. The pre-determined duration may be determined by the user, the fleet operator or the person responsible for doing so and may include, e.g., half an hour, an hour, 2 hours, 3 hours, 4 hours etc. These may be labelled as resting places for the device, for example, the vehicle. The algorithm may then make a decision about inclusion of a place within the storage database as a location of interest via step 306.

The discovered places or locations of interest may then be augmented with more information that is either entered by the fleet operator or derived from map services provided by third-parties via step 308. The most important pieces of information may be any of: the address of the location (if known), the name of the place (if defined by the operator or the third party map service provider) and the type of business, monument or place of worship etc. at that location (if something is identifiable) or a combination thereof. The data augmentation allows the system and method to associate an 'intent' when drivers are seen approaching a known place. The fleet operator may also be allowed to mark some places as 'hidden' which may then be filtered out when displaying it back to the fleet operator or the user of the device.

A radius of proximity that is used for determining proximity of places may be defined by the user or provided to the system, by the user or the fleet operator or the party responsible for doing so, and may use units such as meters, kilometers, yards, miles etc., for example, 50 meters, half a kilometer, 50 yards, one mile etc. If a newly discovered resting place is within the radius of proximity of an already defined place, that place is marked with the device information, time, and duration of stay of the current device, otherwise, the location is treated as a newly discovered place and is added to the storage database via step 310.

The algorithm may be designed to work within the SaaS (Software as a Service) model where one physical database may be maintained to include all accounts associated with that database, but data for devices identified to each account may be treated by keeping it separate for each account and processing it exclusively for that account within the database to maintain privacy of each account. For example, even though the learning and discovery algorithm may be able to use data collected from different accounts to learn new places and store is in one data storage, or data center, it may not be allowed to display data received from the devices or certain parts of the data received from the devices associated with another account or results obtained from processing such data.

The actual process of discovery, for example, step 304, may be triggered by using a script that runs at periodic intervals, for example, once a day, once a week etc. An alternate way to trigger the discovery process may be through a streaming API that analyzes a trip as soon as it ends and stores the stop-locations during the trip. Alternatively, the discovery process may be defined as an ongoing process, collecting device data in near-real time as the devices move around performing their functions.

The discovered places may then be clustered to form bigger groups based on location. For example, locations of interest detected by the system, within a proximity radius of 1 mile from a known place of interest, may be grouped together as a cluster. The radius of proximity may thus define the granularity of the discovered place on a map. Several such collections or clusters with different radii of separation—all of which may be derived from the base collection with lowest granularity may be stored. Although the example provided here uses 1 mile as radius of proximity, other radii of proximity may be used as discussed before.

One of the typical problems associated in using aggregates of several places is the inherent risk of placing the aggregated value on a location which may or may not be an actual location on the map, for example, the aggregate location may turn out to be a water body in the area. The algorithm may avoid such situation by taking the modal value of number of visits (e.g., highest number of visits) when aggregating over nearby locations. Different criteria may be used when creating the locations with larger radius of separation, for example, the criteria used for aggregating may specify that "all locations must be 'at least' Y meters away from each other" where various values of Y, and/or units as chosen by the user or the fleet operator, may be used for creating locations or location clusters with different and/or desired granularity.

Figure 4:
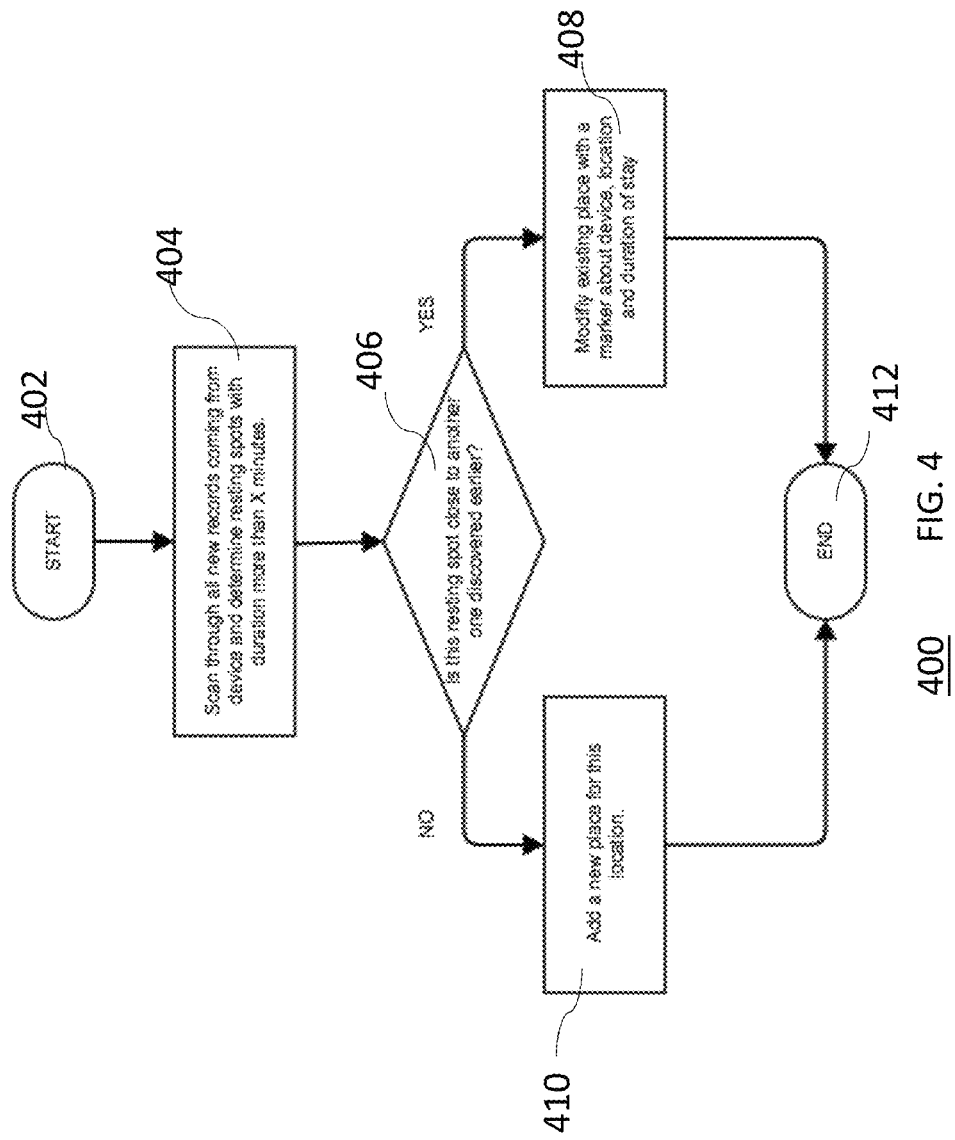
FIG. 4 illustrates a process and system for learning places of interest using IoT devices according to an embodiment described herein.

FIG. 4 illustrates a process for learning places of interest using IoT devices according to an embodiment described herein corresponding to element 310 illustrated in FIG. 3. In an embodiment, the method utilizes an algorithm that works incrementally on collected device records, for example, device identifier, location of the device, location of the stop, duration of stop, time of the day for the stop, day of the week for the stop, etc. The algorithm may first scan through the device records and arrange them sequentially with respect to time, also called as a discovery process. It may then detect times and places where no movement of the device has occurred over a pre-determined time duration via step 404. These may be labelled as resting places for the device, for example, the vehicle. Additionally, the algorithm may also make a decision about inclusion of a place within the storage database as a location of interest based on the rules specified by the user. For example, a user, e.g., a fleet operator may provide flag to switch off the display of certain discovered locations or by minimum number of visits required to be included, or by specific location, e.g., home, office, etc.

A radius of proximity that is used for determining proximity of places may be defined by the user, e.g., a fleet operator, or provided to the system via step 306. If a newly discovered resting place is within the radius of proximity of an already defined place, that place is marked with the device information, time, and duration of stay of the current device via step 408. Additionally, it may also be marked with other information such as but not limited to: day of the week, date etc. Otherwise, the location is treated as a newly discovered place and is added to the storage database via step 410.

FIG. 5A illustrates an exemplary user interface for viewing learned places of interest using IoT devices according to an embodiment described herein. FIG. 5A illustrates an exemplary screen shot 400 showing places/locations of interest with a separation of at least 1 Kilometers and minimum 5 visits per place.

FIG. 5B illustrates an exemplary user interface for viewing learned places of interest using IoT devices according to an embodiment described herein. FIG. 5B illustrates an exemplary screen shot 400' showing places/locations of interest with a separation of at least 20 Kilometer with minimum 10 visits per place.

Figure 5C:
FIG. 5C illustrates an exemplary user interface for viewing learned places of interest using IoT devices according to an embodiment described herein.

FIG. 5C illustrates an exemplary mobile application user interface for viewing learned places of interest using IoT devices according to an embodiment described herein.

Figure 5D:
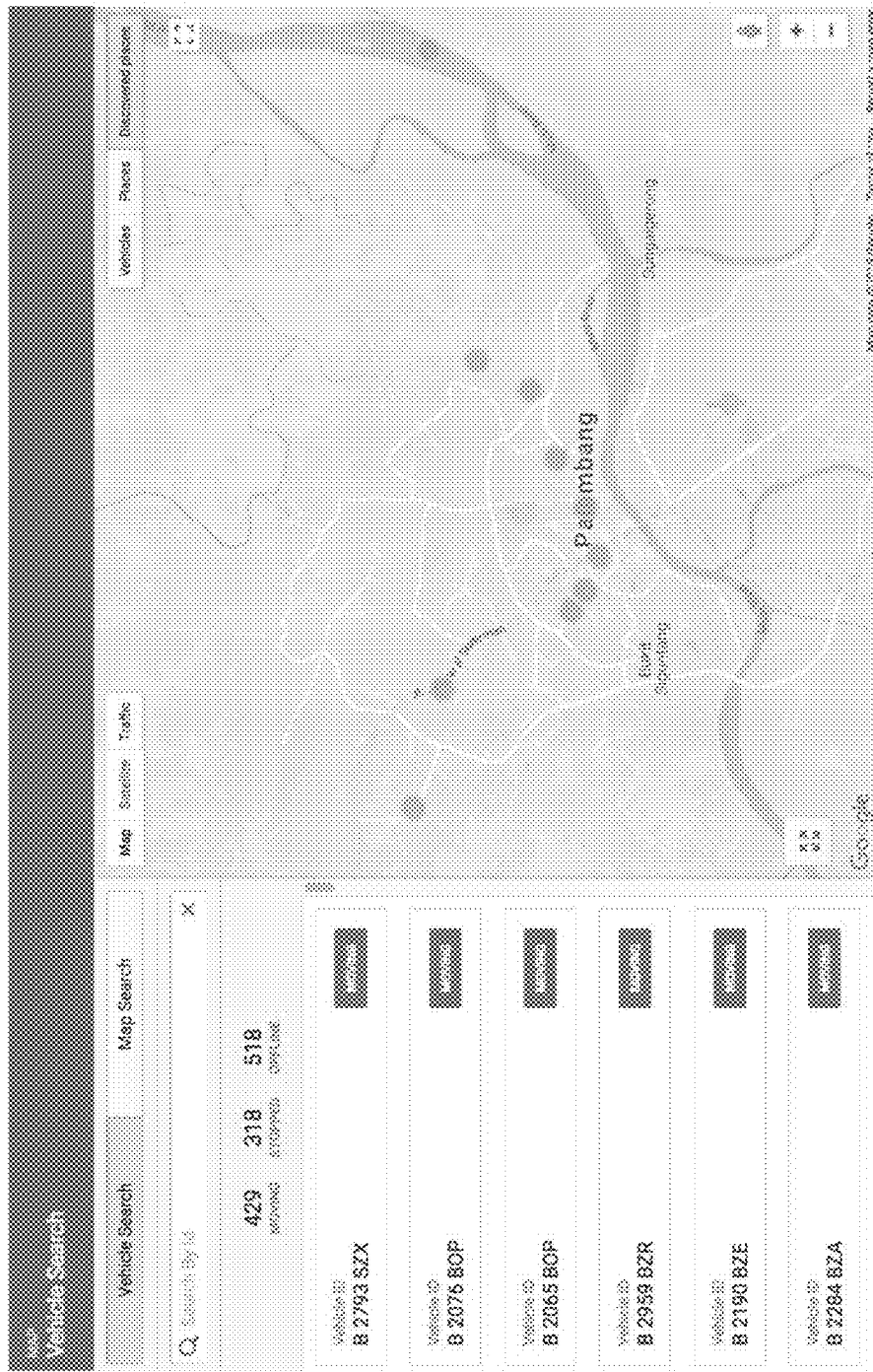
FIG. 5D illustrates an exemplary user interface for viewing learned places of interest using IoT devices according to an embodiment described herein.

FIG. 5D illustrates an exemplary desktop application user interface for viewing learned places of interest using IoT devices according to an embodiment described herein. FIG. 5D illustrates a screen shot 500''' showing discovered places using an exemplary user interface.

Figure 5E:
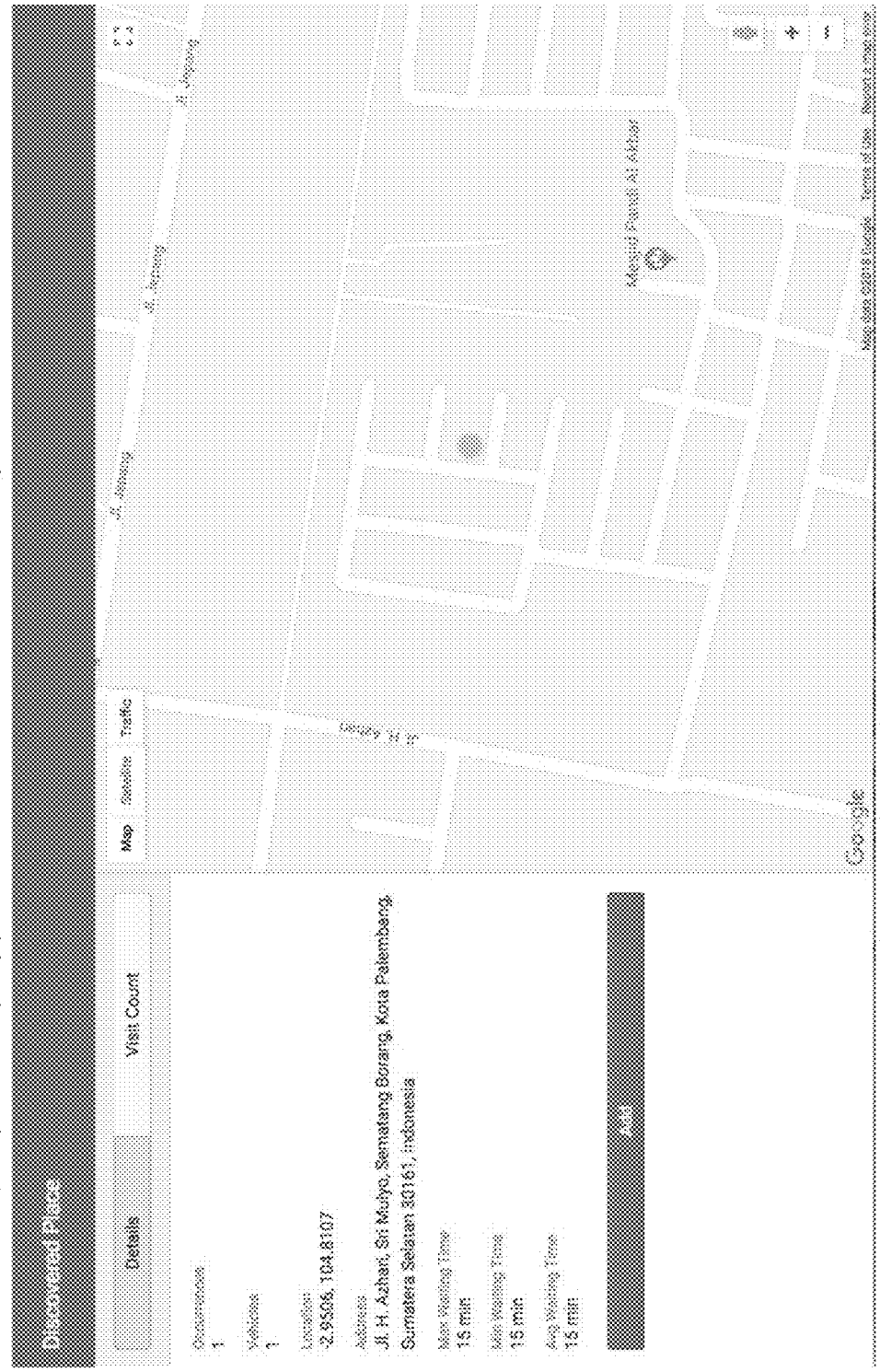
FIG. 5E illustrates an exemplary user interface for viewing learned places of interest using IoT devices according to an embodiment described herein.

FIG. 5E illustrates another exemplary desktop application user interface for viewing learned places of interest using IoT devices according to an embodiment described herein. FIG. 5E illustrates another screen shot 500'''' showing discovered places using an exemplary user interface.

Figure 6:
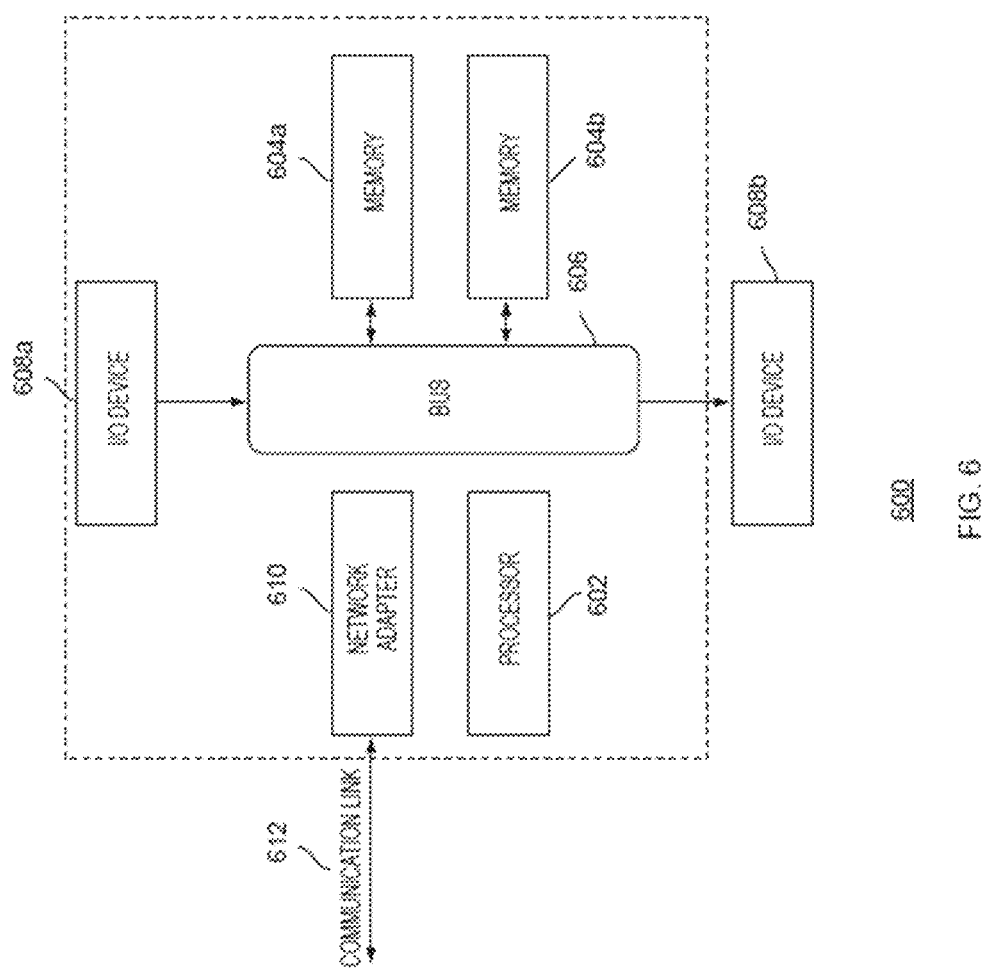
FIG. 6 illustrates a data processing system 600 suitable for storing the computer program product and/or executing program code relating to learning places of interest using IoT devices in accordance with an embodiment described herein.

FIG. 6 illustrates a data processing system 600 suitable for storing the computer program product and/or executing program code relating to learning places of interest using IoT devices in accordance with an embodiment described herein. The data processing system 600 includes a processor 602 coupled to memory elements 604a-b through a system bus 606. In other embodiments, the data processing system 600 may include more than one processor and each processor may be coupled directly or indirectly to one or more memory elements through a system bus.

Memory elements 604a-b can include local memory employed during actual execution of the program code, bulk storage, and cache memories that provide temporary storage of at least some program code in order to reduce the number of times the code must be retrieved from bulk storage during execution. As shown, input/output or I/O devices 608a-b (including, but not limited to, keyboards, displays, pointing devices, etc.) are coupled to the data processing system 600. I/O devices 608a-b may be coupled to the data processing system 600 directly or indirectly through intervening I/O controllers (not shown).

In FIG. 6, a network adapter 610 is coupled to the data processing system 602 to enable data processing system 602 to become coupled to other data processing systems or remote printers or storage devices through communication link 612. Communication link 612 can be a private or public network. Modems, cable modems, and Ethernet cards are just a few of the currently available types of network adapters.

Embodiments of the process described herein can take the form of an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the words "preferable", "preferably" or "preferred" in the description above indicates that the feature so described may be more desirable, it nonetheless may not be necessary and embodiments lacking the same may be contemplated as within the scope of the invention, that scope being defined by the claims that follow. In addition, it should be understood that while the use of words indicating a sequence of events such as "first" and "then" shows that some actions may happen before or after other actions, embodiments that perform actions in a different or additional sequence should be contemplated as within the scope of the invention as defined by the claims that follow.

As used herein, the term "cellular communication" is understood to include various methods of connecting any type of computing or communications devices, servers, clusters of servers, using wired and/or wireless communications networks to enable processing and storage of signals and information, and where these services may be accessed by applications available through a number of different hardware and software systems, such as but not limited to a web browser terminal, mobile application (i.e., app) or similar, and regardless of whether the primary software and data is located on the communicating device or are stored on servers or locations apart from the devices.

As used herein the terms "device", "appliance", "terminal", "remote device", "wireless asset", etc. are intended to be inclusive, interchangeable, and/or synonymous with one another and other similar communication-based equipment for purposes of the present invention, even though one will recognize that functionally each may have unique characteristics, functions and/or operations which may be specific to its individual capabilities and/or deployment.

Similarly, it is envisioned by the present invention that the term "wireless network" includes networks using one or more communication architectures or methods, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, 5G, wireless local area network (WIFI) or Bluetooth and Ethernet.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer implemented method for learning places of interest for a plurality of users using one or more Internet of Things (loT) devices, the method comprising:
   learning and storing location information of the one or more IoT devices;
   detecting a location where no movement of the one or more IoT devices has occurred for a pre-determined duration of time;
   determining whether the detected location is classified as a learned location of interest based on a pre-defined criteria for determining the location of interest; and
   clustering the learned location of interest with lower radius of separation into bigger groups with a larger radius of separation using a clustering algorithm based on location information of the learned location of interest for the one or more IoT devices using a pre-defined criteria for clustering the learned location of interest into bigger groups,
   wherein the clustering algorithm uses a modal value of the detected location by popularity of visits to determine center of the cluster when aggregating nearby locations.

2. The computer-implemented method of claim 1, wherein detecting a location where no movement of the one or more IoT devices has occurred comprises analyzing the location information of the one or more IoT devices.

3. The computer-implemented method of claim 2, wherein the location information of the one or more IoT devices comprises latitude and longitude of the one or more IoT devices.

4. The computer-implemented method of claim 2, wherein the location information of the one or more IoT devices further comprises any one or more of: number of visits by the one or more IoT devices, day of the visits, date of the visits, time of the visits, duration of the visits.

5. The computer-implemented method of claim 1, wherein the pre-determined criteria for determining the location of interest comprises any one or more of: time of the day, number of visits by the one or more IoT devices.

6. The computer-implemented method of claim 1 further comprising augmenting the learned location of interest with other relevant data.

7. The computer-implemented method of claim 6, wherein augmenting the learned location of interest with other relevant data comprises associating the learned location with one or more of: known address of a business, activity of a certain type, monument and place of worship.

8. The computer-implemented method of claim 6, wherein the pre-defined criteria for clustering the learned location of interest into bigger groups comprises any one or more of: existence of a location as a known location, proximity of newly discovered locations to the known location based on radius of proximity, time of visit of the one or more IoT devices and duration of stay of the one or more IoT devices.

9. A system for learning places of interest for a plurality of users using one or more Internet of Things (loT) devices, the system comprising users using one or more IoT devices, a data processing system and a user interface, wherein the data processing system further comprises:
   a location-aware database, wherein the database learns and stores location information of the users using one or more IoT devices;
   a processor, wherein the processor detects a location where no movement of the one or more IoT devices has occurred for a pre-determined duration of time, and determines whether the detected location is classified as a learned location of interest based on a pre-defined criteria for determining the location of interest; and
   a clustering engine, wherein the clustering engine forms the learned location of interest with lower radius of separation into bigger groups with a larger radius of separation of learned places based on location information for the users using one or more IoT devices using a pre-defined criteria for clustering the learned location of interest into bigger groups, wherein the clustering engine uses a modal value of the detected location by popularity of visits to determine center of the cluster when aggregating nearby.

10. The system of claim 9, wherein detecting a location where no movement of the one or more IoT devices has occurred comprises analyzing the location information of the users using one or more IoT devices by an analytics engine.

11. The system of claim 10, wherein the location information of the one or more IoT devices comprises latitude and longitude of the at least one of the one or more of IoT devices.

12. The system of claim 10, wherein the location information of the one or more IoT devices further comprises any one or more of: number of visits by the one or more IoT devices, day of the visits, date of the visits, time of the visits, duration of the visits.

13. The system of claim 9, wherein the pre-determined criteria for determining the location of interest comprises any one or more of: time of the day, number of visits by the one or more IoT devices.

14. The system of claim 9 further comprising a data augmentation engine, wherein the data augmentation engine augments the learned location of interest with other relevant data.

15. The system of claim 14, wherein augmenting the learned location of interest with other relevant data comprises associating the learned location with one or more of known address of: a business, activity of a certain type, monument and place of worship.

16. The system of claim 14, wherein the pre-defined criteria for clustering the learned location of interest into bigger groups comprises any one or more of: existence of a location as a known location, proximity of newly discovered locations to the known location based on radius of proximity, time of visit of the one or more IoT devices and duration of stay of the one or more IoT devices.

17. A non-transitory computer-readable medium having executable instructions stored therein that, when executed, cause one or more processors corresponding to a system having a storage database, a data processing system including a processor, a database and a user interface to perform operations comprising:
  learning and storing location information of a plurality of users using one or more Internet of Things (loT) devices to a storage database;
  detecting a location where no movement of the one or more IoT devices has occurred for a pre-determined duration of time;
  determining whether the detected location is classified as a learned location of interest based on a pre-defined criteria for determining the location of interest; and
  clustering the learned location of interest with lower radius of separation into bigger groups with a larger radius of separation using a clustering algorithm based on location information of the learned location of interest for the users using one or more IoT devices using a pre-defined criteria for clustering the learned location of interest into bigger groups,
    wherein the clustering algorithm uses a modal value of the detected location by popularity of visits to determine center of the cluster when aggregating nearby locations.

18. The non-transitory computer-readable medium of claim 17, wherein detecting a location where no movement of the one or more IoT devices has occurred comprises analyzing the location information of the one or more IoT devices.

19. The non-transitory computer-readable medium of claim 18, wherein the location information of one or more IoT devices comprises latitude and longitude of the one or more IoT devices.

20. The non-transitory computer-readable medium of claim 18, wherein the location information of one or more IoT devices further comprises any one or more of: number of visits by the one or more IoT devices, day of the visits, date of the visits, time of the visits, duration of the visits.

21. The non-transitory computer-readable medium of claim 17, wherein the pre-determined criteria for determining the location of interest comprises any one or more of: time of the day, number of visits by the users using one or more IoT devices.

22. The non-transitory computer-readable medium of claim 17 further comprising augmenting the learned location of interest with other relevant data.

23. The non-transitory computer-readable medium of claim 22, wherein augmenting the learned location of interest with other relevant data comprises associating the learned location with one or more of: known address of a business, activity of a certain type, monument and place of worship.

24. The non-transitory computer-readable medium of claim 22, wherein the pre-defined criteria for clustering the learned location of interest into bigger groups comprises any one or more of: existence of a location as a known location, proximity of newly discovered locations to the known location based on radius of proximity, time of visit of the one or more IoT devices and duration of stay of the one or more IoT devices.

* * * * *